US007818792B2

(12) United States Patent
Shamsaasef et al.

(10) Patent No.: US 7,818,792 B2
(45) Date of Patent: *Oct. 19, 2010

(54) METHOD AND SYSTEM FOR PROVIDING THIRD PARTY AUTHENTICATION OF AUTHORIZATION

(75) Inventors: Rafie Shamsaasef, San Diego, CA (US); Geetha Manglore, San Diego, CA (US); Petr Peterka, San Diego, CA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1029 days.

This patent is subject to a terminal disclaimer.

(21) Appl. No.: 10/067,610

(22) Filed: Feb. 4, 2002

(65) Prior Publication Data

US 2003/0149880 A1 Aug. 7, 2003

(51) Int. Cl.
*G06F 7/04* (2006.01)
(52) U.S. Cl. .............................. 726/10; 726/2; 713/155; 713/168; 713/171
(58) Field of Classification Search ............... 726/1–10, 726/17–21, 26–30, 155–159, 172, 175; 713/150, 713/182

See application file for complete search history.

(56) References Cited

U.S. PATENT DOCUMENTS

| 5,319,710 A | 6/1994 | Atalla et al. |
| 5,455,953 A | 10/1995 | Russell |
| 5,590,199 A | 12/1996 | Krajewski, Jr. et al. |
| 5,832,228 A * | 11/1998 | Holden et al. ............... 709/225 |
| 5,872,849 A * | 2/1999 | Sudia ........................ 713/175 |
| 6,009,177 A * | 12/1999 | Sudia ........................ 713/191 |

(Continued)

FOREIGN PATENT DOCUMENTS

EP 0695985 A1 2/1996

(Continued)

OTHER PUBLICATIONS

Maxwell, D., et al.; PacketCable™ Security Specification; PKT-SP-SEC-102-001222; Dec. 22, 2000; Title page, Document Status Sheet, Table of Contents, Table of Figures, Table of Tables, Sections 1-4 and Section 6.5; CableLabs®.

(Continued)

*Primary Examiner*—Pramila Parthasarathy
(74) *Attorney, Agent, or Firm*—Stewart M. Wiener (57) ABSTRACT

A method and system (100) for providing third party authentication when requesting content and/or services from an application server (106). The method is applicable to key management protocols that utilize the concept of tickets. The method and system include a client (102) being coupled with a third party application server (107), wherein the client submits a request for content from the third party application server and the third party application server returns requested information and corresponding authentication. The client further couples with a first application server (106), wherein the client submits a key request (KEY_REQ) including the third party server information and corresponding authentication to the first application server. The first application server authenticates the third party server information and verifies client authorization based on third party information. The first application server returns a key reply (KEY_REP) if the third party server information is authenticated and client authorization is verified.

17 Claims, 2 Drawing Sheets

U.S. PATENT DOCUMENTS

| | | | |
|---|---|---|---|
| 6,067,620 A * | 5/2000 | Holden et al. | 713/155 |
| 6,138,235 A | 10/2000 | Lipkin et al. | |
| 6,381,331 B1 * | 4/2002 | Kato | 380/37 |
| 6,684,331 B1 * | 1/2004 | Srivastava | 713/163 |
| 2003/0018913 A1 * | 1/2003 | Brezak et al. | 713/201 |
| 2003/0018915 A1 * | 1/2003 | Stoll | 713/201 |
| 2003/0028762 A1 * | 2/2003 | Trilli et al. | 713/153 |
| 2003/0093694 A1 * | 5/2003 | Medvinsky et al. | 713/201 |
| 2004/0003287 A1 * | 1/2004 | Zissimopoulos et al. | 713/201 |
| 2005/0114666 A1 * | 5/2005 | Sudia | 713/175 |

FOREIGN PATENT DOCUMENTS

WO    WO 03/045036 A2    5/2003

OTHER PUBLICATIONS

Ganesan, R; "Yaksha: Augmenting Kerberos with Public Key Cryptography," Network and Distributed System Security 1995, Proceedings of the Symposium in San Diego, CA, USA, IEEE Coput. Soc., Feb. 16, 1995, pp. 132-143, XP010134533. ISBN 0-8186-7027-4.

Kohl, J. et al., "The Kerberos Network Authentication Service (V5), FRC 1510", Network Working Group Request for Comments, Sep. 1993, pp. 1-112, XP002254582.

* cited by examiner

METHOD AND SYSTEM FOR PROVIDING THIRD PARTY AUTHENTICATION OF AUTHORIZATION

BACKGROUND OF THE INVENTION

1. Field of the Invention

The present invention relates generally to network security, and more specifically to a method and system for providing authentication of authorization for access to content and/or services from an application server.

2. Discussion of the Related Art

The Internet is an insecure network. Many of the protocols used on the Internet do not provide any security. Data that is transmitted over the Internet without using encryption or any other type of security scheme is said to be transmitted "in the clear." Tools are readily available that allow hackers to "sniff" data, such as passwords, credit card numbers, client identity and names, etc., that is transmitted over the Internet in the clear. Thus, applications that send unencrypted data over the Internet are extremely vulnerable.

Kerberos is an example of a known network authentication protocol that is designed to provide authentication for client/server applications by using secret-key cryptography. The Kerberos protocol, which is available from the Massachusetts Institute of Technology, uses cryptography so that a client can purportedly prove its identity to a server (and vice versa) across an insecure network connection. After a client and server have used Kerberos to prove their identity, they can also encrypt all of their communications to purportedly assure privacy and data integrity as they conduct their business.

It is with respect to these and other background information factors relevant to the field of network security that the present invention has evolved.

SUMMARY OF THE INVENTION

The present invention provides a method and apparatus for providing third party authentication when requesting content and/or services from an application server. The method includes the steps of: requesting authenticated access information from third party server that may be utilized to authorize the client; receiving access information from the third party server; receiving authentication from the third party server; generating a key request including the access information received from the third party server and accompanying authentication using tickets; forwarding the key request (KEY_REQ) to an application server; and receiving a key reply (KEY_REP) if the third party server information is authenticated using the tickets and the client authorization is verified by the application server.

In another embodiment, the invention provides a method for third party application server authentication comprising the steps of: a client submitting a request to a third party server; the third party server generating requested information; the third party server generating authentication; the third party server forwarding the requested information and authentication to the client; the client submitting a key request to an application server wherein the key request includes the requested information and authentication; the first application server verifying the authentication of the third party server information using tickets and verifying client authorization; and the application server returning a key reply to the client if the third party server information is authenticated using tickets and client authorization is verified.

In another embodiment, the invention provides a method comprising the steps of: receiving a request from a client for information used by an application server in authorizing the client to access content; generating information utilized by the client to access the desired content from a first application server; generating authentication of the requested information for the client to access the content from the first application server; and forwarding the requested information and authentication to the client.

In another embodiment, the invention provides a method comprising the steps of: receiving a key request from a client; extracting a third party server information; extracting a third party server authentication; verifying third party information; verifying a third party authentication; and issuing a key reply if the third party server information is authenticated using tickets and client authorization is verified.

In another embodiment, the invention provides a method comprising the steps of: receiving a request for content from a client; generating requested information for the client to access the content; generating authentication of the information for the client to access the content; sending the requested information and authentication to the client; receiving a key request for the content from the client that includes requested information and authentication; verifying the authentication of the requested information using tickets and verifying client authorization; and sending a key reply to the client.

In another embodiment, the invention provides a method comprising the steps of: receiving a selection for services; issuing access information for the services; issuing authentication of the access information; receiving a key request; verifying the authentication of the access information; verifying the client authorization; and issuing a key reply if the access information and client authorization are verified.

In another embodiment, the invention can be characterized as a computer program product providing third party server authentication of authorization to access content and/or services from a first application server. The computer program product comprising: mediums for embodying computer programs for input to computers; and computer programs embodied in the mediums for causing the computers to perform the following functions: submitting a request to a third party server from a client; the third party server generating access information; the third party server generating authentication; the third party server forwarding the access information and authentication to the client; the client submitting a key request to an application server wherein the key request includes the access information and authentication; the first application server verifying the authentication of the access information and client authorization; and the application server returning a key reply to the client if the access information and client authorization are verified.

In another embodiment, the invention can be characterized as a system for providing third party server authentication of access information. The system includes: a client coupled with a third party application server, wherein the client submits a request for content from the third party application server and the third party application server returns access information and authentication to the client; and the client further coupling with a first application server wherein the client submits a key request including the access information and authentication to the first application server and the first application server verifies the access information and the client and the first application server returns a key reply if the access information and client are verified.

In another embodiment, the invention can be characterized as an apparatus for providing authentication of a message exchange from a third party server not involved in the message exchange. The system includes: a client being coupled with a first server, wherein the client being configured to perform a message exchange with the first server; the client being coupled with a third party server configured to issue access information to the client for the message exchange and to provide authentication of the access information; and the client being further configured to submit the access information and authentication to the first server during the message exchange.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

Previous authentication protocols, including Kerberos, do not provide mechanisms for ensuring authorization rights for access and use, including viewing, receiving, downloading, implementing and other such access, to third party information, data, media, applications, processes, services, programs and other such content and/or services provided over a distributed network. For example, if a client or viewer desired to gain access to a third party's content, for example a digitally stored movie, the client selects purchase options and obtains the corresponding authenticator and possibly additional content rules from the third party. The client then requests the content (i.e., the digitally stored movie) to be delivered from a caching server.

The present invention provides a method, process, system, apparatus, computer program, and computer program product that utilizes an authentication of third party access information prior to allowing a client to gain access to the third party's content or services that are distributed by an alternate network entity, such as a caching server.

The present invention is well-suited to key management protocols that utilize the concept of tickets. A ticket is a validation token that is given out to a client by a key distribution center (KDC). Typically, a ticket contains at least the name of the client, name of a specific server and a session key (a symmetric encryption key). The session key and in one embodiment, the client name, are kept secret and are encrypted with another key, called a service key. The service key is a secret key that is known only to the KDC and a particular server named in the ticket. Because the client does not also possess this service key, it does not have the ability to decrypt the ticket and change its contents. Normally, the client also needs to know the session key and since it can't get it out of the ticket, the KDC sends to this client a separate copy of the same session key.

In order to validate a message with a ticket (e.g., Key Request message described in more detail below), a client would include in this message both a ticket and a checksum that is keyed with the session key. When the server named in the ticket receives this message from the client, it is able to decrypt the ticket with its service key, verify the client name and obtain the session key. The session key is then subsequently used to verify the keyed checksum and thus validate the whole message.

A ticket-based validation similar to the one just described is utilized in previous protocols, including Kerberos as defined in the Kerberos IETF standard (RFC 1510). In one embodiment, the present invention is implemented in an ESBroker protocol developed by the Motorola Corporation, which additionally utilizes this ticket based validation. A ticket may have other information as well, including a validity period (start time and expiration time), various flags, client authorization data, etc. However, previous protocols, such as Kerberos, do not provide for a mechanism to authenticate the third party server access information utilized in verifying the client authorization to access content and/or services.

In accordance with an embodiment of the present invention, a third party application server, such as a content provider, provides services to clients and other entities of a network through one or more alternate application servers, for example one or more caching servers. As such, clients gain access to the services and/or content provided by the third party application server by accessing one of the alternate application servers. Therefore, the third party server is actually a third party to the interaction between the client gaining access to the services or content through the alternate application server. To gain access to the content and/or services through the alternate servers, the third party server provides a client with access information, such as selected purchase options, payment information and additional information related to the content and/or services provided by the third party.

The third party server additionally supplies an authentication to the client. The alternate application server utilizes the authentication to verify the access information from the third party server when the client attempts to obtain the content and/or services through the alternate application server. This avoids the need for an additional interface between the third party and the alternate server. Further, supplying the additional information from the third party to the alternate application server through the client when the client attempts to gain access to the content and/or services, the alternate server does not need to compile the additional information and match it with the client request.

The present invention adds new functionality not available with previous protocols, such as standard Kerberos, where standard Kerberos does not provide mechanisms to pass third party server information and associated authentication from a client to an alternate network component, such as an alternate application server. Additionally, the present invention reduces network communication traffic and interfacing by allowing additional information to be forwarded through a client to the alternate server.

In one embodiment, the present invention additionally allows a client to access one or more third party servers without the need to obtain a service ticket to those third party servers. Because no proprietary or secret information is communicated between the client and the third party server and because the third party server does not itself authorize the client to receive content, the client does not need a service ticket. The client simply uses a service ticket for an alternate application server to gain access to the alternate network component. In one embodiment, the actual client authorization is performed by the alternate network component based on the authenticated third party server information that it receives through the client.

Figure 1:
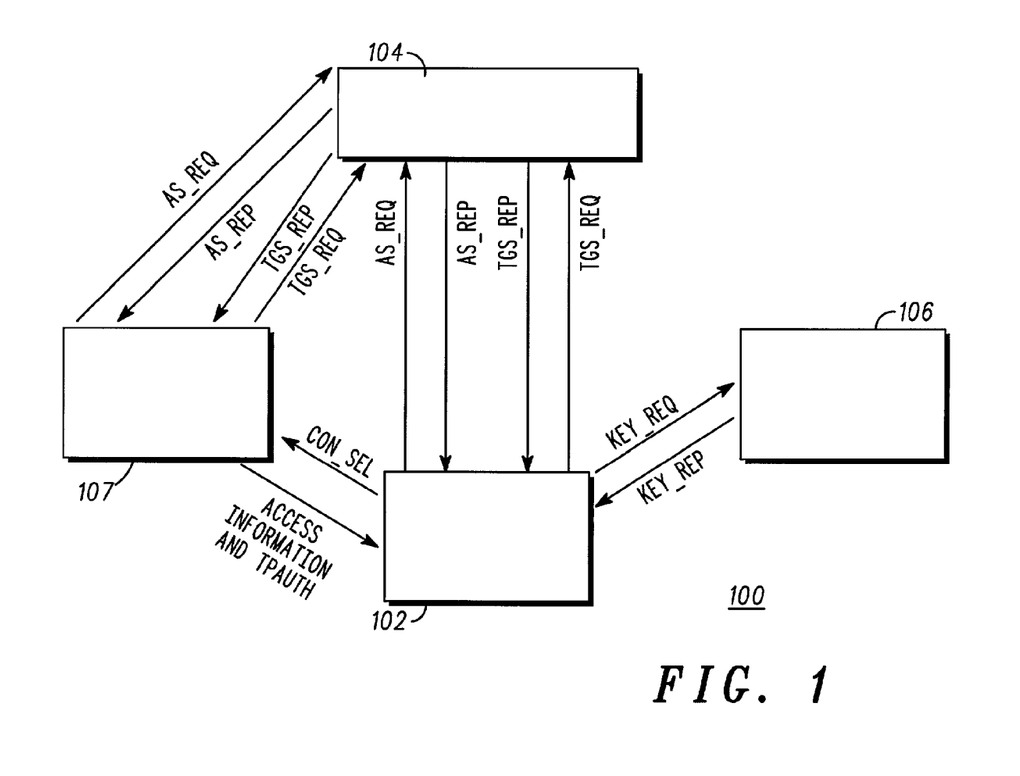
FIG. 1 is a block diagram illustrating a system made in accordance with an embodiment of the present invention.

FIG. 1 depicts a simplified block diagram of a system 100 implemented in accordance with an embodiment of the present invention. The system 100 uses an authentication key management protocol that provides security and privacy on a network, such as the Internet, an intranet and other types of networks, and that can scale, for example to millions of users. In general, the system 100 involves one or more clients 102 interacting with one or more centralized Key Distribution Centers (KDC) 104 using both public key and symmetric key algorithms, as well as with individual application servers, such as the first and second application servers 106 and 107. The protocol is generic and can easily be adapted to different applications that utilize authentication in a distributed environment. Furthermore, the system 100 can be interfaced with one or more centrally administered user databases. For simplicity, the embodiment shown in FIG. 1 includes only one client 102 and two application servers 106, 107; however, it will be apparent to one skilled in the art that the network 100 can include numerous clients, application servers and other network components without departing from the novelty of the present invention.

The client 102 may comprise a process or device that makes use of a network service on behalf of a user. By way of example, the client 102 may comprise any type of server, computer, microprocessor, process and program. In one embodiment, the client 102 may comprise a "thin client" such as a wireless telephone, pager, personal digital assistant (PDA), home appliance having a low-end microprocessor or other device having limited processing capabilities. Note that in some cases a server may itself be a client of some other server (e.g., a print server may be a client of a file server). The application servers 106, 107 provide resources to network clients. In one embodiment, the second application server 107 provides services and/or content to the client 102 through the first application server 106. The second application server 107 provides access information utilized to authorize the client to gain access to the services and/or content. The client 102 uses this third party server information to gain authorization and initiate the first application server 106 to deliver the services and/or content. As such, the second application server 107 is a third party to the client's interaction with the first application server 106 to gain access to the services and/or content.

In one embodiment, the KDC 104 provides application server service tickets (ST ticket) to the client 102 and the third party server 107. The ST tickets are an end service ticket that the client 102 and the third party application server 107 present to the first application server 106 when the client 102 and/or third party application server requests service. The first application server 106 provides various services and/or content authorized with related access information from the third party application server 107 to the client 102, when the client 102 authenticates itself using the ST tickets and a third party authentication (TPAuth) supplied by the second application server 107 to the client.

Examples of the basic message types used by one embodiment of the system 100 for providing TPAuth and services and/or content to the client 102 are as follows:

(A) Authentication Server Request message (AS_REQ): Message from the client 102 (or the third party application server 107) to request Ticket Granting Ticket (TGT) tickets from the KDC 104;

(B) Authentication Server Reply message (AS_REP): Reply message to the client 102 (or the third party application server 107) from the KDC 104 with the TGT tickets;

(C) Ticket Granting Server Request message (TGS_REQ): Message from the client 102 (or third party application server 107) to request an ST ticket from the KDC 104;

(D) Ticket Granting Server Reply message (TGS_REP): Reply message from the KDC 104 to the client 102 (or third party application server 107) with the ST tickets;

(E) Content Selection (CON_SEL): Message sent from the client to the third party application server 107 to select services and/or content. The services and/or content are to be supplied to the client 102 through the first application server 106. In one embodiment, the CON_SEL includes a payment option(s) that is used by the client to designate a form of payment for those services or content selected. The CON_SEL message typically does not require authentication and is not a specific protocol (e.g., ESBroker or Kerberos) key management message. The present invention does not depend on a specific format of this message. For example, the CON_SEL message can be implemented using standard HTTP;

(F) Session Rights and Third Party Authorization (TP-Auth): Message sent from the third party server 107 to the client 102 providing authorization and authentication of the authorization to allow the client 102 to access the services and/or content provided through the first application server 106. The TPAuth message is not a specific protocol (e.g., ESBroker or Kerberos) key management message. The present invention does not depend on a specific format of this message. However, the message typically includes the requested third party information and an associated ticket-based authenticator. It could, for example, be implemented using standard HTTP;

(G) Key Request message (KEY_REQ): Message sent from the client 102 to the first application server 106 to request security (key management) parameters; and (H) Key Reply message (KEY_REP): Reply message from the first application server 106 to the client 102 with sub key and application specific data.

In one embodiment, each of the messages typically includes a header followed by the body of the message. By way of example, the header may include a message type field, a protocol version number field, and checksum. The message type field indicates the message type, such as AS_REQ, AS_REP, etc. Following the message header is the body of the message having the list of attributes. In one embodiment, the attributes are in type-length-value (TLV) format.

As an example, the client 102 and third party server 107 generate AS_REQ messages to initiate the authentication service exchange between the client 102 and the KDC 104, and the third party application server 107 and the KDC 104 when the client 102 and third party server 107 wish to obtain TGT tickets. The TGT tickets are tickets to initiate the generation of ST tickets from the KDC 104 for the first application server 106 (or other servers, not shown). In other words, the AS_REQ message is sent by the client 102 and third party application server 107 to the KDC 104 to obtain the TGT ticket which is used by the client and third party application server to request ST tickets for specific application servers, such as the first application server 106.

By way of example, the AS_REQ message may include the client's identity (e.g., name) (or third party server's identity), the KDC's identity, and a nonce to tie the request to a response. The AS_REQ may also include a list of symmetric encryption algorithms that are supported by the client 102. To check against replays, this message may also include a timestamp, as well as a signature for message integrity. The signature may be a keyed checksum or a digital signature.

The public key to verify a signature is preferably kept in the user database. Digital certificates can be optionally included in the AS_REQ message and may be utilized instead of the stored public keys to verify digital signatures. The client 102's permanent symmetric key for verifying a keyed checksum is preferably kept in the same user database. The AS_REQ message may also include public key information that is used for key agreement (e.g., Elliptic Curve Diffie-Hellman parameters). By way of example, Elliptic Curve may be used for public key encryption because of its processing speed. The elliptic curve encryption can be one or two orders of magnitude faster than other encryption techniques, such as RSA. The Rijndael encryption standard may be used with the 128-bit key length.

The KDC 104 processes the AS_REQ message in order to verify it. If the AS_REQ processing does not generate errors, the KDC 104 generates an AS_REP message in response to the AS_REQ message. Specifically, the KDC 104 looks up the KDC's and client 102's keys in the database and generates a random session key, for subsequent authentication with the KDC 104. The KDC 104 generates a TGT ticket, which can include a clear part and an encrypted part. For example, the KDC 104's identity and the ticket validity period may be provided in the clear inside the issued TGT ticket. The encrypted part of the ticket contains the client 102's (or third party server 107's) name, session key and any other data to be kept private. The ticket preferably also provides a list of encryption types and checksum types supported by the KDC 104. The encrypted part of the ticket may be encrypted using the KDC 104's secret key.

The AS_REP message should preferably be signed by the KDC 104 using an algorithm that is identical to the one used by the client 102 (or third party server 107) to generate a signature for the AS_REQ message. This signature can be either a digital signature or a keyed checksum using the client 102's secret key. The public key information is the KDC 104's public part of the key agreement parameters and should indicate the same key agreement algorithm as the one selected by the client 102. Finally, the AS_REP message preferably contains the nonce that was copied from the AS_REQ message, to prevent replays.

The encrypted part of the AS_REP message typically contains the same information as is in the TGT ticket so that the client 102 (or third party server 107) has read-only access to its own authorization-data (if it is present in the TGT), but this is not a requirement of the present invention. This optional feature provides a convenience to the user because if the client 102 knows it own authorization data, it is not going to attempt actions that are later going to be rejected by an application server anyway, since an application server trusts only the copy of the client information that is encrypted inside the ticket. Also, for clients with hardware security that prevents a user from hacking and changing its own authorization data, this optional feature could be a security advantage because readable authorization data might also authorize the client for some local actions, for example the right to save and replay movies on local disk. In one embodiment, the encrypted part of the AS_REP message preferably also contains the client 102's identity to verify that this reply was originally constructed by the KDC 104 for this particular client 102. The data is preferably encrypted with a symmetric key derived from the key agreement algorithm.

The client 102 (or third party server 107) processes the AS_REP message to verify its authenticity and to decrypt the private ticket part in the message to obtain the TGT ticket. If the authenticity of the AS_REP message cannot be verified, the client 102 preferably does not send an error message back to the KDC 104. In some cases, the client may retry with another AS_REQ message.

The present invention optionally allows the passing of digital certificates in both the AS_REQ and AS_REP messages, to allow the client 102 (or third party server 107) and the KDC 104 to authenticate each other with digital certificates. Without certificates, it is expected that the client 102 is already provisioned with the KDC public key and that the KDC 104 already has the client 102's (or third party server's) public key in its database. A digital signature on an AS_REQ is verified by the KDC 104 with a client public key that it looks up in its database. The client 102 verifies a digital signature on an AS_REP with a pre-provisioned KDC public key.

After the client 102 (or third party server 107) has obtained a TGT ticket via the KDC 104 exchange, the client 102 initiates the TGS_REQ message exchange between the client 102 and the KDC 104 when the client 102 (or third party server 107) wishes to obtain authentication credentials for a given or particular application server, such as the first application server 106. The TGS_REQ message is generated and sent by the client 102 to the KDC 104 to obtain an application server service ticket (ST ticket) that can be used in a KEY_REQ message. The client 102 presents the TGT ticket obtained from the AS_REP message as part of the TGS_REQ message. The TGS_REQ message specifies the first application server 106's identity as well as the client 102's identity (which is inside the TGT ticket). In one embodiment, the client 102's identity is protected because it is in the encrypted part of the TGT ticket and is not included in the clear part of the message. The session key from the TGT ticket may be used for the encryption and decryption in the TGS_REQ exchange. Thus, a snooper is unable to detect which services the client (i.e. user) is requesting.

After the client 102 sends out the TGS_REQ message it preferably saves a nonce value included in the TGS_REQ in order to later validate the matching TGS_REP message from the KDC 104. The client 102 preferably keeps the nonce value until a configurable time out value expires. After the time out, the client 102 no longer is able to process the corresponding TGS_REP and must retry.

The KDC 104 verifies the TGS_REQ message and processes the TGT ticket. The KDC 104 then generates the TGS_REP message in response to the TGS_REQ message. The TGS_REP message includes the ST ticket (which is the end service ticket) issued by the KDC 104, which the client 102 (or third party server 107) presents to the application server 106 when it wants to request a service and/or content. The application server 106's identity and the ticket validity period may be provided in the clear inside the issued ST ticket. The encrypted part of the ST ticket can contain the client 102's name and a session key encrypted with a key shared by the application server 106 and the KDC 104. Any additional client data that is to be kept private could be included as part of the encrypted part of the ST ticket. Client data inside ST ticket may include client authorization-data as in the case of a TGT. An encrypted part of a TGS_REP message preferably contains the same information as in the ST ticket so that the client 102 (or third party server 107) has read-only access to its own authorization-data, but this is not a requirement of the present invention. Client read-only access to its own authorization-data inside an ST ticket has the same advantages as the client access to its own authorization data inside a TGT. The TGS_REP message is signed by the KDC 104 with a keyed checksum using the TGT ticket session key. Finally, the TGS_REP message contains the nonce that was copied from the TGS_REQ message to prevent replays.

By way of example, the KDC 104 may generate the TGS_REP message using the following procedure. First, the nonce from the TGS_REQ message is included in the TGS_REP message to tie it to the request. Next, the KDC 104 assigns the type of the random (service ticket) session key. If more than one encryption algorithm is available, the KDC 104 preferably selects the strongest one. The KDC 104 then generates the ST ticket. The application server 106's secret key is used to encrypt the encrypted ticket part and also generate a keyed checksum over the whole ST ticket. The end time of the ST ticket is preferably determined by the KDC 104. The client 102 may specify a shorter lifetime, if it wishes. The encrypted part of the ST ticket contains the client 102's identity, session key and other private data. The TGT ticket session key is used to generate the encrypted data portion of the TGS_REP message, and a keyed checksum (using the TGT session key) is added over the TGS_REP message. Again, this is just one example of a procedure that the KDC 104 may use to generate the TGS_REP message.

The TGS_REQ and TGS_REP messages are sent and received by the client 102 (or third party server 107) when the client has yet to receive an ST ticket for the server, e.g., the client 102 has not yet received an ST ticket for the first application server 106. Additionally, the client 102 can issue a TGS_REQ if the client has an ST ticket that has expired. Otherwise, the steps to obtain an ST ticket are not necessary.

When the client 102 wishes to obtain access to services and/or content with related information generated by the third party application server 107 and distributed by the first application server 106, the client 102 determines what services and/or content is desired. For example, if the third party server 107 is a content provider providing pay-per-view movies, the client 102 initiates a review of the potential movies supplied by the third party server 107. Once the desired service and/or content is determined, the client generates the CON_SEL message exchange between the client 102 and the third party server 107 to obtain access information corresponding to the desired service and/or content, which is utilized later for authentication of client authorization by the first application server 106. The CON_SEL message is generated and sent by the client 102 to the third party server 107 to obtain the access information, session rights and the TPAuth, which are used in a KEY_REQ message.

In one embodiment, the client 102 also obtains an ST ticket to the third party application server 106 to optionally establish private encrypted session with the third party server or for the purpose of obtaining full client authorization for the service and/or content instead of just the information later used in the authorization process.

The client 102 presents the request for the desired services and/or content as part of the CON_SEL message. The CON_SEL message specifies the third party application server 107's identity as well as the client 102's identity. In one embodiment, the client 102's identity is protected because it is in the encrypted part of the CON_SEL message and is not included in the clear part of the message. The CON_SEL further includes a client Session Identification (session ID) for verification of the returned session rights. Typically, the session ID is a random number generated by the client 102. In one embodiment, the CON_SEL is encrypted and authenticated using a link key established earlier between the client and the third party server using the present invention's KEY_REQ/KEY_REP exchange (described further below).

After the client 102 sends out the CON_SEL message it preferably saves the session ID value in order to later validate the matching session rights and TPAuth message from the third party server 107. The client 102 preferably keeps the session ID until a configurable time out value expires. After the time out, the client 102 is no longer able to process the corresponding session rights and TPAuth and must retry.

Upon receipt, the third party server 107 verifies the CON_SEL message. If the CON_SEL message is encrypted and/or authenticated, the third party server decrypts the CON_SEL message using the previously established link key. Once the CON_SEL message is verified, the third party server 107 generates the session rights and TPAuth messages in response to the CON_SEL message. In one embodiment, the third party server 107 generates a domain of interpretation (DOI) object which is authenticated by the third party server 107. The DOI object includes the session rights which are typically sent by the client with the KEY_REQ message when the client 102 requests a secure session from the first application server 106 to receive the desired services and/or content.

The present invention does not depend on a particular method used to optionally authenticate and/or decrypt the CON_SEL message. As an example, this message can be authenticated and decrypted using a shared link key that was established earlier between the client and the third party server using the KEY_REQ/KEY_REP exchange.

In one embodiment, the DOI object designates a DOI_Type identifying the DOI object as providing session rights. In the third party server access information the session ID is included to allow the client 102 to verify the session rights. This same session ID may be used to identify a secure streaming session once the key management is complete and the security parameters are established. The same security parameters with this session ID can be applied to RTP, RTCP and RTSP protocols associated with the same streaming session. An end time is included in the session rights to designate a time after which the session rights are no longer valid. The third party server 107's and the client's identification are additionally included in the session rights. A ContentID is included to designate the desired content and/or services. In one embodiment, the ContentID is a URL, such as an RTSP URL. The first application server 106 saves this URL and associates it with the session ID. The ContentID is used to verify the requested URL via the RTSP protocol. The session rights can also optionally include a purchase option designating the payment and payment type of the desired services and/or content.

Additional parameters that the session rights optionally include are restrictions to distribution, such as country blackouts restricting the distribution of the desired content to a specific county or countries; geographic blackouts restricting distribution to a specific geographic area or areas; and subscription ID which provides service IDs under which the desired content is offered for subscription.

The session rights are accompanied by the TPAuth to authenticate that the third party server 107 generated the session rights and the TPAuth, and that the session rights and the TPAuth were not generated by another entity of the network 100, such as the client, an alternate client or an alternate server. In one embodiment, the TPAuth includes: a third party server ST ticket that the third party server 107 previously received for the first application server 106; a third party server signature; and an elapse time. The session key in the third party server ST ticket to the first application server is used to generate the signature of the access information. In one embodiment, the generation of the TPAuth is independent of the generation of the access information, authorization and session rights. In one embodiment, the signature is generated with a symmetric key and a signature generated with a symmetric key, is generally known as MAC (Message Authentication Code). An example of a MAC algorithm is a HMAC (Hashed Message Authenticated Code). A MAC is also known as a keyed checksum.

In one embodiment, the session rights and authentication can be encrypted using a session key known to both the third party server and the client, where the client has previously obtained a service ticket for the third party server. The session rights and authentication are forwarded from the third party server 107 to the client 102. The client verifies the session rights and authentication to a CON_SEL message using at least the sessionID (for identifying a session) included within the session rights.

The KEY_REQ and KEY_REP messages are used for key management and authentication between the client 102 (or third party server 107) and the first application server 106. The KEY_REQ message is sent by the client 102 to the application server 106 in order to establish a new set of security parameters. The KEY_REQ message can also be used by the client 102 to periodically establish new keys with the first application server 106. The client 102 starts out with a valid ST ticket, previously obtained from the KDC 104. The first application server 106 starts out with its service key that it can use to decrypt and validate tickets. The KEY_REQ message includes the ST ticket for the first application server and a signature comprising a checksum keyed with the session key over the contents of the KEY_REQ needed to authenticate the client 102. The KEY_REQ message preferably also contains a nonce (to tie it to the response KEY_REP message) and the client timestamp (to prevent replay attacks). In one embodiment, the client nonce is a pseudo random number generated by the client 102, where the client verifies that the nonce does not correspond to outstanding KEY_REQ messages.

The KEY_REQ further includes an encrypted DOI, and as such, includes the third party information that may be used to authorize a client. The contents of the encrypted DOI are application dependent. It is defined by the application. In general, it contains one or more target protocol-specific identifiers that distinguish this particular target protocol session from other sessions that might exist between the client 102 and the first application server 106. Other information may also be included in the encrypted DOI. The DOI may be encrypted by the client and in some cases is encrypted using null encryption algorithm (when client privacy is not desired). The session key inside the ST ticket is issued to encrypt the data.

The KEY_REQ additionally includes the TPAuth. In one embodiment, the TPAuth contains the third party server 107's ST ticket for the first application server 106, the third party server signature and a time limit. The first application server 106 verifies the third party server ST ticket, the third party server signature using the session key and ensures the time limit has not been exceeded.

In one embodiment, when the client 102 generates the KEY_REQ message, the client 102's identity is in the encrypted part of the client 102's ST ticket for the application server 106 so it is not included in the clear part of the message. After the client 102 sends out the KEY_REQ message, it saves the client nonce value in order to later validate the matching KEY_REP message from the application server 106. The client 102 keeps the client nonce value until a configurable time out value expires. After the time out, the client 102 is no longer able to process the corresponding KEY_REP message. The client 102 may retry after this time out.

The following is one example of the processing of the KEY_REQ. Initially, the first application server 106 parses the message header. If the header parsing fails, the application server 106 drops the message and does not return an error. The first application server 106 then verifies the protocol version number in the header. If the protocol version is not supported, the application server 106 drops the message and does not return an error. The application server 106 then verifies the ST ticket for the client 102 to gain access to the service and/or content from the first application server 106.

In verifying the client ST ticket, in one embodiment, the first application server 106 parses the ST ticket. If the format of the ST ticket does not match the specification, the verification fails. If the first application server 106 does not support the ticket version number, the verification fails; if the server name and realm name in the ST ticket do not match that of the first application server 106, verification fails; if the version of the service key used to encrypt the ST ticket is not the current version used by the first application server 106, the first application server 106 decrypts the ST ticket if the first server 106 still has the service key version number specified in the ST ticket, otherwise the verification fails. The first application server 106 decrypts the private part of the ST ticket with the first application server service key and then parses the decrypted data. If the decryption or parsing fails, the verification fails. The first application server 106 verifies the keyed checksum over the ST ticket using the same service key that is also used to decrypt the private part of the ST ticket. If the verification of the checksum fails or the first application server 106 does not support the checksum type, the verification fails. The first application server 106 further verifies the validity period (ticket start and end times) and if the ticket is either expired or not yet currently valid, the verification fails. If there are no errors the first application server 106 verifies the ST ticket.

If the verification of the ST ticket fails with a non-recoverable error code, the application server 106 reports an error and aborts further processing of the KEY_REQ. The signature attribute is verified next. If the verification fails, the KEY_REQ is dropped and an error is not returned. If the ST ticket verification above resulted in a recoverable error code, the application server 106 attempts to utilize an old service key to extract the session key from the ST ticket for verifying the signature.

The first application server 106 next checks the client time to ensure that the KEY_REQ has not expired. The first application server 106 also decrypts the encrypted DOI using the session key from the ST ticket to obtain the DOI object. The application server 106 then verifies the TPAuth. If the TPAuth is not recognized or it is determined that the TPAuth was tampered with, the first application server 106 returns an error to the client 102. Otherwise, the application server 106 further processes the DOI object, which is application specific. If there are errors the errors are returned. If there are no errors in the processing of the DOI object, the client authorization is verified the first application server 106 generates the appropriate KEY_REP based on the contents of the DOI object.

In processing the TPAuth, the first application server 106 extracts the third party server 107's ST ticket from the TPAuth. The first application server 106 then verifies the ST ticket. If there are errors in verifying the third party server 107's ST ticket, the errors are returned to the client 102 and the authentication fails. The first application server 106 further decrypts the private ticket part of the third party server 107's ST ticket using the service key and extracts the session key. The third party server 107's signature is parsed. The first application server 106 further generates a signature of the DOI object using the session key obtained from the decrypted third party server 107's ST ticket. The generated DOI object signature is verified with the signature of the TPAuth to verify the authentication of the access information. If the verification fails, the first application server 106 returns an error to the client 102. In one embodiment, during the processing of the DOI object, the first application server 106 proceeds to verify the authorization of the client. This is accomplished by matching the information returned in the DOI object with the client authorization that may be present inside the ticket and also matching against additional information affecting authorization that may be locally stored on the application server 106. For example, the application server might have additional restrictions for all clients that connect to the internet using a particular ISP.

The KEY_REP message is sent by the first application server 106 in response to the KEY_REQ message. The first application server 106 processes the KEY_REQ, and if conditions are met and the third party application server 107's access information and authentication are verified returns the KEY_REP. By way of example, the KEY_REP message may include a randomly generated subkey, encrypted with the session key shared between the client 102 and the application server 106. Similar to a KEY_REQ, for the symmetry of the protocol, KEY_REP could also contain a DOI object and corresponding authenticator (TPAuth) in the case when the client needs to obtain some additional information that is authenticated by a third party server. The TPAuth in the KEY_REP includes an ST ticket, signature and expiration time, where the ST ticket belongs to the third party application server 107 and not the client 102. The session key in the third party server 107's ST ticket is used to generate the signature included in an encrypted DOI reply. The KEY_REP message may also include additional information that is needed to establish security parameters.

Figures 2, 3:
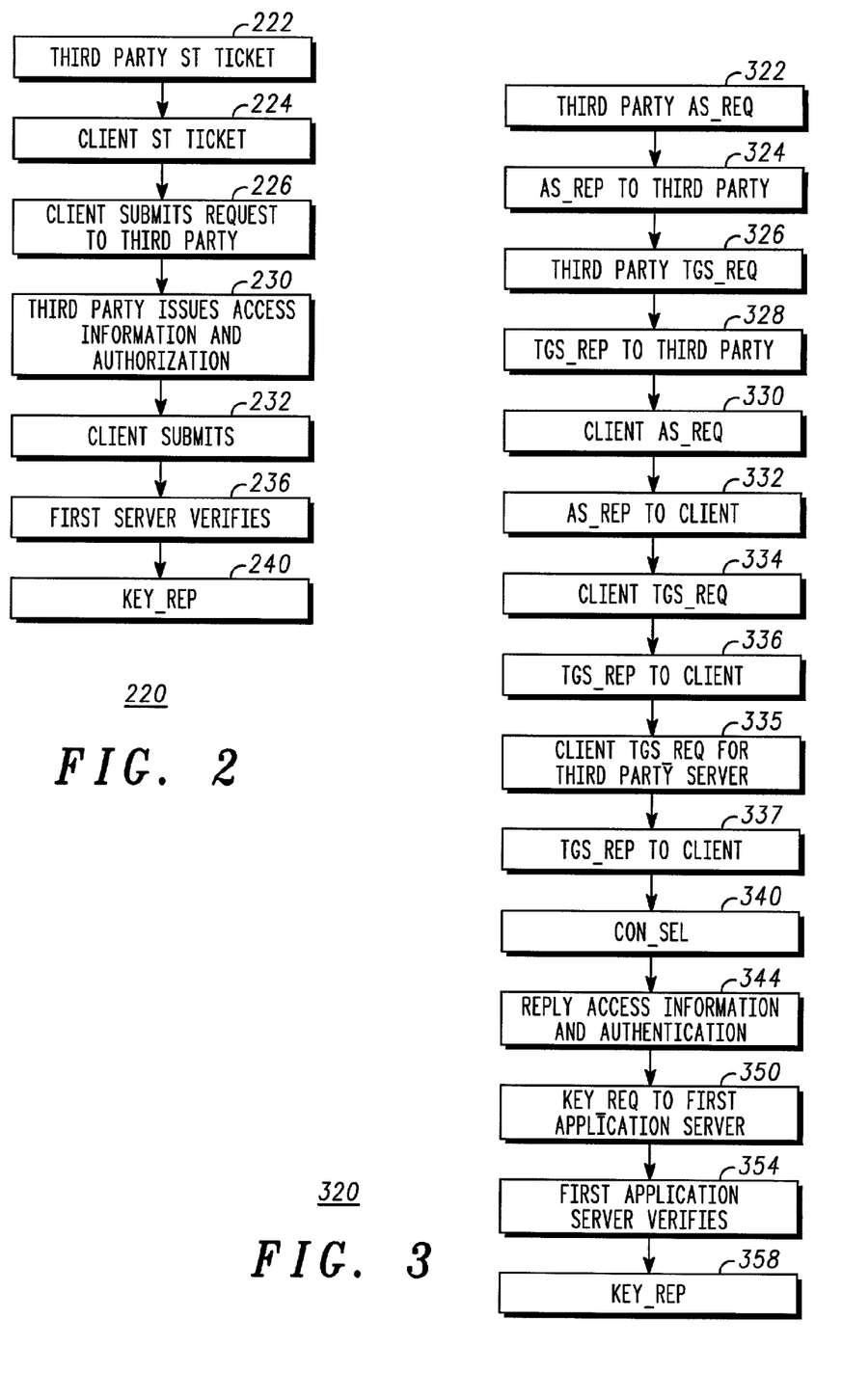
FIG. 2 is a flow chart illustrating a method of providing authentication of third party information when a client requests content from a first application server in accordance with an embodiment of the present invention.
FIG. 3 is a flow chart illustrating a method of providing authentication of third party information when a client requests content from a first application server in accordance with an embodiment of the present invention.

FIG. 2 depicts a simplified flow diagram of one implementation of one embodiment of a process 220 for providing third party application server 107 information and authentication to a client 102 request for access to applications, processes, services and/or content supplied by the third party application server 107 through a first application server 106. In step 222 the third party application server 107 obtains an ST ticket to the first application server 106. In step 224, the client 102 obtains an ST ticket to the first application server 106. In step 226, the client 102 submits a request to the third party application server 107 to access the applications, programs and/or content. In step 230, the third party application server 107 issues session rights and TPAuth to the client 102. In step 232, the client 102 submits a KEY_REQ to the first application server 106, where the KEY_REQ includes the session rights and the TPAuth. In step 236, the first application server 106 verifies the client authorization based on the session rights and any other locally stored information that may be relevant to client authorization and TPAuth. In step 240, the first application server 106 returns a key reply, including subkeys, to the client 102 if the client authorization and TPAuth are verified.

FIG. 3 depicts a simplified flow diagram of one implementation of one embodiment of a process 320 for providing third party application server 107 information and authentication to a client 102 request for access to services and/or content supplied by the third party application server 107 through a first application server 106. In step 322 the third party application server 107 submits an AS_REQ for a ticket-granting-ticket (TGT) to the KDC 104. In step 324 the KDC 104 issues an AS_REP proving a TGT to the third party application server 107. In step 326 the third party application server 107 submits a TGS_REQ to the KDC requesting an ST ticket to the first application server 106. In step 328, the KDC 104 returns a TGS_REP with an ST ticket for the first application server 106. In step 330 the client 102 submits an AS_REQ for a ticket-granting-ticket (TGT) to the KDC 104. In step 332 the KDC 104 issues an AS_REP proving a TGT to the client 102. In step 334 the client 102 submits a TGS_REQ to the KDC 104 requesting an ST ticket to the first application server 106. In step 336, the KDC 104 returns a TGS_REP to the client 102 with an ST ticket for the first application server 106.

In step 335 the client 102 submits a TGS_REQ to the KDC 104 requesting an ST ticket to the third party application server 107. In step 337, the KDC 104 returns a TGS_REP to the client 102 with an ST ticket for the third party application server 107. In step 340 the client 102 submits a request to the third party application server 107 to access and select the applications, programs and/or content. In one embodiment, the client 102 encrypts at least a portion of the request, using a session key inside the client 106's ST ticket for the third party application server 107. In step 344 the third party application server 107 returns session rights accompanied with TPAuth to the client 102.

In step 350, the client 102 submits a KEY_REQ to the first application server 106, where the KEY_REQ includes the session rights and the TPAuth. In step 354, the first application server 106 verifies the client authorization based on the session rights and any other locally stored information that may be relevant to client authorization and TPAuth. In step 358, the first application server 106 returns subkey(s) to the client 102. However, it will be apparent to one skilled in the art that some of the steps described above may be rearranged without departing from the novelty of the present invention. For example, steps 330-336 could alternately occur between steps 344 and 350, where the client would obtain the identity of the caching server in step 344, and the client would then obtain the caching server service ticket (on-demand).

As discussed above, the first application server 106 may provide a service and/or content to the client 102 after the client obtains information needed for client authorization from a third party (e.g., second application server 107) to receive the service or content. As one example, the third party server 107 may be a pay-per-view movie supplier which utilizes one or more caching servers (e.g., the first application server 106) to actually distribute the movie content to one or more authorized clients. This allows the content to be distributed across the network 100 to locations closer to the clients to reduce network traffic and routing complexities, and to optimize other network considerations. To gain access to the content, a movie for example, the client 102 initially accesses the third party server 107 or other listing (such as a listing provided through a content directory shared between multiple content providers) and selects one or more desired movies. The third party server 107 then returns access information later used in client authorization by the caching server 106 for the client 102 to access the movie from the caching server 106. In one embodiment, third party access information is supplied as session rights. The third party server 107 additionally issues an authentication with or as part of the session rights.

The client 102 forwards these session rights and authentication to the caching server (i.e., first application server 106) when attempting to obtain access to the desired content, in this example the desired movie. This authentication is used by the caching server 106 to verify that the third party information was actually generated by the third party server 107 (i.e., the pay-per-view supplier) as opposed to an alternate network entity, such as the client or other entity forging third party information.

Thus, the present method and system provide third party service and/or content providers with an efficient method for allowing clients to obtain services and/or content from an alternate application server while still obtaining information from a third party service and/or content provider and securely including this information inside a ticket-based key management protocol. This method of including third party authentication based on tickets is considerably more efficient (requiring less processing power) than other previous methods and systems that utilize digital signatures and digital certificates. The client obtains some information from a third party server that may be relevant to a client authorization and that information is efficiently authenticated using a ticket. This third party information may also include content rules that in other prior art systems are normally sent directly from a third party server to an alternate application server thus disadvantageously requiring an additional network interface. The present invention provides for client-server key management and client authorization that are not provided by previous ticket-based key management systems such as Kerberos.

For example, the third party server access information can include a name, location, and/or network address for a billing system that is used to bill for access to client requested content and/or services. Because the first application server 106 cannot trust the client to specify the billing system, the first application server authenticates the billing system information.

The present invention allows key requests that include third party information (for example a domain of interpretation (DOI) object), where the key request is generated by a first component or party such as a client, to be authenticated by a third party that is not involved in that message exchange process. This authenticator is useful where the originator of the third party information is not the sender of the key request, but some other third party.

The present invention can be implemented and applied to substantially any distributed rights management system using key exchange. Additionally, the present invention is further capable of being implemented in substantially any ticket-based key management protocol. In one embodiment, the present invention is implemented through client and server ends of secure multimedia content exchange systems, video-on-demand systems, multicast content distribution systems, and other such systems where content and/or services are exchanged between components of a network, such as a client and server.

The exchange of multimedia content is not limited to audio or video only and it is not limited to streamed content. The exchange applies to other exchanges, such as downloads of secure documents, e-books, software distribution, programs, applications, upgrades, music files, and other such exchanges.

The present invention can be implemented and applied to other key management protocols based on tickets and a trusted ticket distributor (i.e., one or more KDCs), such as Kerberos. Additionally, the authentication can be implemented and applied to substantially any such key management protocol where the separation of data and authentication is utilized. In one embodiment, the present invention makes third party authentication of the third party information a part of the key management protocol and is handled by the key management daemon, independent of the application-specific contents of the third party information. In one embodiment, the present invention is implemented in an electronic security broker (ESBroker) protocol developed by Motorola, Inc., and as part of an IP rights management system also developed by Motorola, Inc.

Separating the processing of the third party information from the authentication enables the present invention to be more generic and applicable to a plurality of key management systems and a plurality of protocols. The present invention provides for a sender of a message exchange, such as a key request, to attach an authentication to third party information without the sender knowing the format of the third party information. The subject invention is capable of being implemented in substantially any ticket-based key management system where information communicated between two parties, which is not generated by one of the two parties and instead is generated by a third party, can be authenticated as being generated by the third party. Further, the subject invention is capable of being implemented in substantially any distributed rights management system ticket-based protocol for key exchange. The subject invention provides separation of third party server data and its corresponding authentication, allowing additional flexibility to reuse the same key management daemon to establish keys for multiple and possibly unrelated secure applications, some of which may include digital rights management.

While the invention herein disclosed has been described by means of specific embodiments and applications thereof, numerous modifications and variations could be made thereto by those skilled in the art without departing from the scope of the invention set forth in the claims.

What is claimed is:

1. A communication authorization method, comprising:
a third party server receiving a request for access information to access content;
generating the access information and session rights to access the desired content from a first application server;
generating authentication of the access information and session rights using a first service ticket to the first application server, wherein the first service ticket is obtained from a key distribution center (KDC), wherein the KDC is a separate entity from the first application server; and
sending the access information, session rights and authentication to a client, whereby the client presents the access information, session rights and authentication to the first application server to be authorized to receive the desired content from the first application server;
the method further comprising:
the first application server receiving a key request including the access information and authentication;
extracting the access information and authentication;
verifying the authentication of the access information using the first service ticket, and client authorization; and
issuing a key reply if the authentication of the access information and client authorization are verified.

2. The method as claimed in claim 1, further comprising:
encrypting at least a portion of the session rights using a third party server session key for the first application server.

3. The method as claimed in claim 1, further comprising:
requesting a ticket granting ticket (TGT ticket);
receiving a TGT ticket;
requesting the first party server service ticket for the first application server; and
receiving the first party server service ticket for the first application server.

4. The method as claimed in claim 3, further comprising:
the third party server receiving a request for the access information to access content;
generating the third party server access information to access the desired content from a first application server; and
generating the third party server authentication of the access information.

5. The method as claimed in claim 4, wherein the generating the third party server authentication includes incorporating a first party server service ticket for the first application server.

6. The method as claimed in claim 5, wherein the generating the authentication includes generating a signature utilizing a session key of the first party server service ticket.

7. The method as claimed in claim 1, further comprising:
the KDC receiving a second service ticket request from a client for the first application server;
issuing a second service ticket for the first application server; and
the step of the first application server receiving a key request from a client wherein the key request includes the second service ticket.

8. The method as claimed in claim 7, further comprising:
a client generating a key request including the access information and the authentication;
sending the key request to the first application server; and
receiving the key reply (KEY_REP) if the authentication of the access information and client authorization are verified by the first application server.

9. A method for verifying authorization for a client to gain access to content and/or services, comprising:
receiving a key request from a client;
extracting third party server access information, session rights and third party server authentication from the key request;
verifying an authentication of the third party access information, session rights and a client authorization;
issuing a key reply directly to the client if the authentication of the third party access information, session rights and the client authorization are verified;
receiving, in a key distribution center (KDC), wherein the KDC is a separate entity from an application server, a second service ticket request from a client for the application server;
issuing a second service ticket for the application server; and
the step of the application server receiving a key request from a client wherein the key request includes the second service ticket.

10. The method as claimed in claim 9, further comprising:
authenticating the third party server access information using the third party server authentication.

11. The method as claimed in claim 10, wherein the authenticating includes extracting a first service ticket and authenticating the third party server access information using the first service ticket.

12. The method as claimed in claim 9, wherein the extracting the third party server authentication, further comprising the steps of extracting a session key from the first party ticket included in the key request; and the step of authenticating the access information includes verifying a third party server signature using the session key.

13. The method as claimed in claim 12, wherein the extracting the session key includes decrypting at least a portion of the first party ticket included in the key request using the first application server service key and extracting the session key.

14. A method for providing secure communication when distributing services, comprising:
a third party server receiving a selection for services;
issuing access information and session rights for the services;
issuing authentication of the access information and the session rights;
an application server receiving a key request from a client, the key request including the access information and authentication;
extracting the access information and authentication;
verifying an authentication of the access information, session rights and a client authorization utilizing, at least in part, a first service ticket; and
issuing a key reply directly to a client if the authentication of the access information, session rights and the client authorization are verified.

15. The method as claimed in claim 14, further comprising:
a KDC receiving a first service ticket request from a third party server for the first application server;
the KDC issuing the first service ticket to the third party server for the first application server; and
the steps of the third party server issuing access information and authentication including generating the access information and authentication using the first service ticket.

16. The method as claimed in claim 14, further comprising:
the KDC receiving a second service ticket request from a client for the first application server;
issuing a second service ticket for the first application server; and
the step of the application server receiving a key request from a client wherein the key request includes the second service ticket.

17. The method as claimed in claim 14, wherein: the verifying the authentication of the access information includes:
extracting the first service ticket;
decrypting the first service ticket;
extracting a session key from the first service ticket;
generating a signature using the session key; and
verifying the signature over the access information with the session key.

* * * * *

UNITED STATES PATENT AND TRADEMARK OFFICE
CERTIFICATE OF CORRECTION

PATENT NO. : 7,818,792 B2  Page 1 of 1
APPLICATION NO. : 10/067610
DATED : October 19, 2010
INVENTOR(S) : Shamsaasef et al.

It is certified that error appears in the above-identified patent and that said Letters Patent is hereby corrected as shown below:

ON THE FACE PAGE

--In Field (75), under "Inventors", in Column 1, Line 2, delete "Manglore" and insert --Mangalore--

Signed and Sealed this
Twenty-first Day of June, 2011

David J. Kappos
*Director of the United States Patent and Trademark Office*